UNITED STATES PATENT OFFICE.

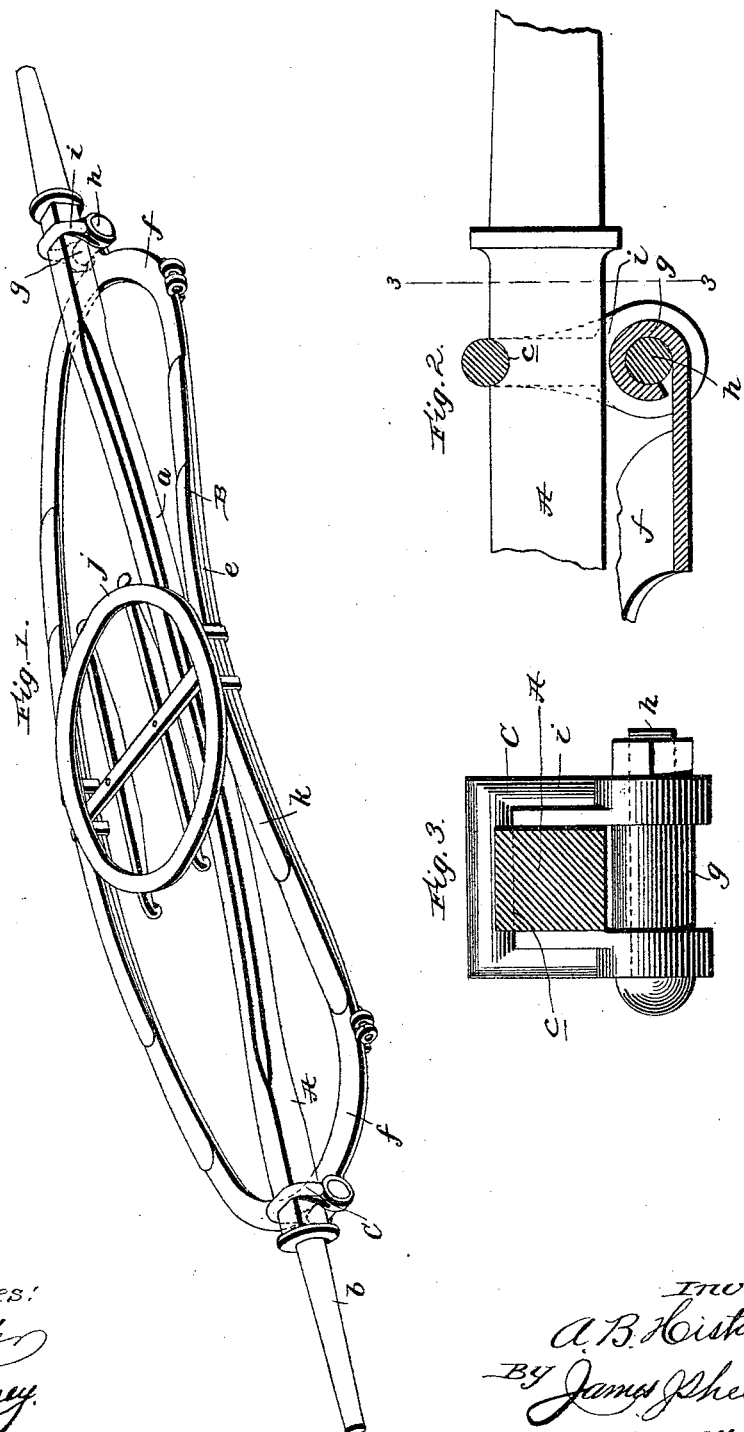

ALBERT B. HISTAND, OF DOYLESTOWN, PENNSYLVANIA.

VEHICLE SPRING-GEAR.

SPECIFICATION forming part of Letters Patent No. 613,370, dated November 1, 1898.

Application filed June 1, 1898. Serial No. 682,276. (No model.)

*To all whom it may concern:*

Be it known that I, ALBERT B. HISTAND, a citizen of the United States, residing at Doylestown, in the county of Bucks and State of Pennsylvania, have invented new and useful Improvements in Vehicle Spring-Gears, of which the following is a specification.

My invention relates to that class of vehicle spring-gear known as "axle-cross;" and it consists in the peculiar and advantageous construction hereinafter described, and particularly pointed out in the claim appended.

In the accompanying drawings, Figure 1 is a perspective view illustrating my improved gear as applied to the front axle of a vehicle. Fig. 2 is an enlarged detail section illustrative of the connection between the end of the spring and the axle. Fig. 3 is a transverse section taken in the plane indicated by the line 3 3 of Fig. 2.

In the said drawings similar letters designate corresponding parts in all of the several views, referring to which, A designates the front axle of a vehicle, which has its portion $a$, intermediate of the spindles $b$, slightly depressed in the ordinary manner and also has transverse bearing-seats $c$ in its upper side adjacent to the spindles.

B designates my improved cross-axle spring, and C designates the hanger-clips, through the medium of which said spring is connected with the axle.

The spring B is formed in one piece, of steel or other resilient metal, and is by preference of ovoid shape when viewed in plan—i. e., has longitudinal portions $e$, arranged in parallel vertical planes, and circular end portions $f$. The said end portions of the spring are disposed below the axle and are provided at their middles with eyes $g$, which are interposed between and pivotally connected by bolts $h$ to the depending arms $i$ of the hanger-clips C, which bear in the seats $c$ of the axle A, after the manner better shown in Fig. 2, so as to permit the ends of the spring to move outwardly without friction when weight is imposed on said spring, and have the said arms $i$ arranged close to the sides of the axle, so as to prevent lateral play. The longitudinal portions $e$ are bowed upwardly, as shown in Fig. 1, so as to permit of their being connected at their middles with the body of a vehicle in the ordinary manner. In the present embodiment of the invention the spring is shown as applied to a front axle, and is therefore provided with a fifth-wheel member $j$, intended for connection in the usual manner with a complementary member fixed to a vehicle-body, said member $j$ being arranged upon and connected to the middles of the longitudinal portions $e$, as shown. It is obvious that the spring may be applied with equal advantage to the rear axle of a vehicle.

For the sake of strength and durability the longitudinal portions $e$ of the spring are each preferably provided with two (more or less) superposed leaves $k$, as best shown in Fig. 1. The use of these leaves, however, is optional, and they may be omitted when desired without departing from the scope of my invention.

As will be appreciated from the foregoing, my improved one-piece spring may be easily and cheaply made and quickly and easily connected with a vehicle-axle. It will also be appreciated that, being formed in one piece, the spring is very strong and durable, and its longitudinal portions $e$ are prevented from giving laterally by the end portions $f$, interposed between said longitudinal portions, which renders the use of a perch or the like unnecessary.

Having thus described my invention, what I claim is—

In a cross-axle spring-gear, the combination of an axle having transverse bearing-seats in its upper side adjacent to its spindles, hanger-clips bearing in the said seats of the axle and having depending apertured arms, the spring formed in one piece of resilient metal and comprising the end portions disposed below the axle and provided with eyes interposed between the arms of the hanger-clips, and the upwardly-bowed, longitudinal portions resting in parallel vertical planes at opposite sides of the axle, and connecting-bolts extending through the arms of the hanger-clips and the eyes of the spring, substantially as specified.

In testimony whereof I have hereunto set my hand in presence of two subscribing witnesses.

ALBERT B. HISTAND.

Witnesses:
JOHN W. HULAND,
HARRY WORTHINGTON.